March 27, 1951 D. W. BALDWIN ET AL 2,546,490
CYLINDER RIDGE GRINDER
Filed Sept. 20, 1947 4 Sheets-Sheet 1

DONALD W. BALDWIN,
WILFRED G. THOMPSON,
WILLIAM H. CLEMENTS,
Inventors.

By
Attorney

March 27, 1951 D. W. BALDWIN ET AL 2,546,490
CYLINDER RIDGE GRINDER

Filed Sept. 20, 1947 4 Sheets-Sheet 2

DONALD W. BALDWIN,
WILFRED G. THOMPSON,
WILLIAM A. CLEMENTS,
Inventors.

By
Attorney

March 27, 1951 D. W. BALDWIN ET AL 2,546,490
CYLINDER RIDGE GRINDER

Filed Sept. 20, 1947 4 Sheets-Sheet 3

DONALD W. BALDWIN,
WILFRED G. THOMPSON,
WILLIAM A. CLEMENTS,
Inventors.

By
Attorney

March 27, 1951 D. W. BALDWIN ET AL 2,546,490
CYLINDER RIDGE GRINDER
Filed Sept. 20, 1947 4 Sheets-Sheet 4

DONALD W. BALDWIN,
WILFRED G. THOMPSON,
WILLIAM A. CLEMENTS,
Inventors.

By
Attorney

Patented Mar. 27, 1951

2,546,490

UNITED STATES PATENT OFFICE 2,546,490

CYLINDER RIDGE GRINDER

Donald W. Baldwin, Los Angeles, Wilfred G. Thompson, Pasadena, and William A. Clements, Glendale, Calif.; said Thompson and said Clements assignors to said Baldwin Application September 20, 1947, Serial No. 775,228

7 Claims. (Cl. 51—245)

This invention relates generally to rotary grinders, and more particularly to grinders of this class which are used for shaping the interior walls of cylinders in engines, pumps and like devices.

When disassembling an internal combustion engine, for example, for the purpose of replacing worn parts or reboring the cylinders, it is frequently necessary, or at least expedient, to remove the pistons through the top of the cylinders. In engines where considerable wear has taken place, such removal is often difficult because of an inwardly projecting annular ridge near the upper end of each bore.

A cylinder ridge of any appreciable size prevents the removal of the piston through the top of the cylinder due to the fact that the piston rings, normally in pressure contact with the cylinder walls, catch under the ridge and lock the piston in the cylinder. Therefore it is desirable when disassembling an internal combustion engine, to first remove the cylinder ridges by cutting or grinding before attempting to remove the pistons.

As is well known in the art, the wear in engine cylinders of the class described tends to elongate the transverse cross section of the cylinder and produce an oval shaped bore. Thus the cylinder ridge, being circular in its cross section, has a considerably greater inward protrusion at the lateral edges of the cylinder bore than it does at the forward and rear edges thereof.

One method of cutting away the cylinder ridge of an elongated cylinder would be to enlarge the diameter of the bore at the upper end until this diameter was equal to or greater than the major diameter of the worn portion of the cylinder. This is an unsatisfactory procedure, however, since an inordinate amount of material must be removed in order to permit removal of the piston, and furthermore, a shoulder is left at the forward and rear edges of the piston, since the diameter of the cut-away portion of the bore would then be greater than the longitudinal diameter of the worn portion of the cylinder.

It is, therefore, desirable in the removal of cylinder ridges to remove only enough material from the wall of the cylinder to bring the walls into continuous alignment, whatever their cross-sectional shape may be. In order to do this, it is necessary to guide the cutting or grinding tool used in the removal of the ridge, by a guiding member in contact with the worn portion of the cylinder walls. One procedure previously followed is to employ a rotating cutter with a stationary guide in alignment with the cutting periphery, and to then move the cutter around the interior wall of the cylinder in planetary fashion with the cutter in contact with the ridge to be removed and the guide member adapted to contact the worn wall so as to prevent further cutting when the ridge has been removed.

When a single cutter is used in the manner just described, there is a pronounced tendency for the cutter to chatter or bounce away from the walls as it moves around its orbit. Furthermore, it has been the usual practice to deliver the mechanical power necessary to rotate the cutting elements manually; usually by means of a ratchet wrench affixed to the means provided for suspension and location of the rotating cutter within the cylinder.

It has been proposed to overcome the foregoing difficulties by performing the ridge removal operation with two or more planetary grinders or cutters driven from a common central power source. Such arrangements are also adapted to be rotated in planetary fashion to carry the rotating grinders or cutters in an orbit around the inside of the cylinder wall. In order to remove only the ridge portion, however, it is necessary that the orbital paths followed by the various cutters be adjustable in diameter so that they may, if necessary, move in and out as they progress around the cylinder walls to accommodate for the aforementioned oval shape thereof. Furthermore, it is necessary that the path of grinders of the class just described be adaptable to fit a wide variety of cylinder sizes if they are to be of any practical value to automotive repair shops, and the like.

Bearing in mind the above listed desiderata and the disadvantages of previous devices, it is a major object of the present invention to provide a grinder of the class described which employs a plurality of planetary cutters operating from a common power source and adapted to be adjusted for operation on cylinders of various sizes.

It is another object of the invention to provide a cutter of the class described in which each cutter is constrained to operate within an orbit corresponding to the cross-sectional shape of the worn portion of the cylinder.

It is still another object of the invention to provide a power transmission in a tool of the class described in which the mechanical power for rotating the cutting elements and for carrying them around the desired orbit is provided from a common central source and which still permits cutting elements to be adjusted as above described, and which does not employ universal or flexible shafts.

A further object of the invention is the provision of a novel spring-loaded mechanism used to guide the grinding elements in their proper orbit and to effect pressure contact thereof with the cylinder wall.

The foregoing and other objects and advantages will become apparent from the following description of a planetary cylinder ridge grinder which embodies the invention.

Briefly described, the apparatus embodying the invention comprises a cylindrical head; a number of rotary grinding stones journally held in the head and projecting below the lower surface; in some embodiments an idler roller, also projecting below the lower surface of the head arranged to roll against the inner walls of the cylinder and spring-loaded to hold the grinding stones in operative contact with the cylinder ridge; a planetary gear transmission to deliver power from a common central shaft to the rotary stones; means to simultaneously adjust the stones in a generally radial direction on the head so as to accommodate the device for various sizes of cylinders; and a second gear train deriving its power from the central drive shaft above referred to in a manner to cause the head itself to rotate, thus carrying the rotating grinding stones in an orbit around the inside of the cylinder wall. In some embodiments the idler roller is dispensed with and means are provided in the orbit adjusting means to effect resilient outward pressure on the rotary stones to maintain them in operative contact with the cylinder wall. A tripod frame is also provided which is adapted to support the grinding apparatus in operative position over a cylinder. The rotary stones and the idler roller are arranged so that their rotary axes fall on a circle which is concentric about the axis of rotation of the head. Since the head itself rotates about the axis of the central shaft, this shaft is held substantially at the axis of the cylinder bore at all times, thus obviating the necessity of universal or flexible shafting to deliver power to the stones.

For a more detailed description of the apparatus embodying the invention, reference should now be had to the attached drawings in which.

Figure 1:
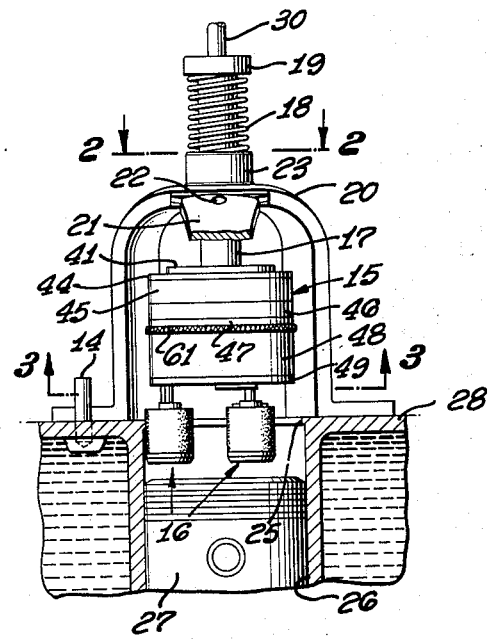
Figure 1 is an elevational view, partially sectioned, which shows the grinding apparatus in operative position on an engine block.
Figure 2:
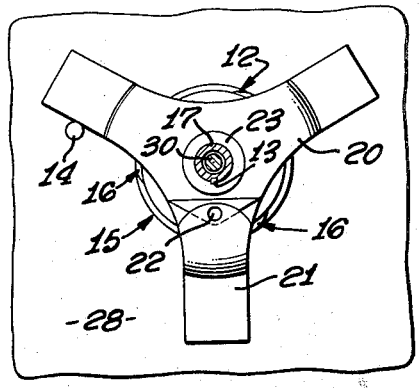
Figure 2 is a plan view taken on the line 2—2 in Figure 1.

In Figure 1 of the drawings, the ridge grinder embodying the invention is illustrated supported in operative position on an engine block 28. The grinder is comprised of a rotating head 15 which supports a number of rotary grinding stones 16 dependent therefrom, and in some embodiments an idler roller 12 (not visible in Figure 1). As can be seen in Figure 1, these stones 16 project downwardly into a cylinder 26, and are positioned to operate on a cylinder ridge 25, the removal of which will permit removal of the piston 27 from the cylinder 26. The head 15 is supported in the position shown by means of a non-rotating shank 17 held in a collar 23 of a tripod frame 20. As can be seen in Figure 2, the three legs of the tripod rest on the upper surface of the cylinder block 28, one of the legs 21 being hingedly supported by a vertical hinge pin 22 at its upper end, whereby the leg may be swung one way or the other to avoid such studs as may be left in the surface of the cylinder block 28. As is also shown in Figure 2, one of the legs of the tripod 20 is placed in abutment with a stud 14 whereby to prevent rotation of the tripod. Furthermore, a key 13 is provided in the collar 23 whereby to prevent rotation of the shank 17 therein. Under conditions of operation of the tool where no studs are left in the cylinder block, rotation of the supporting tripod may be prevented by hand by the operator.

The weight of the head 15 and the members depending therefrom, is supported by a compression spring 18 which surrounds the upper portion of the shank 17 in abutment with the collar 23 and an upper collar 19 formed on the shank 17.

Power to rotate both the head 15 and the stones 16 in a clockwise direction as viewed in Figure 2, is delivered through a drive shaft 30 coaxially positioned and journaled in the shank 17.

Thus it will be seen that as the grinder operates on the ridge 25, the entire head 15 and the stones 16 carried thereby may be manually oscillated up and down to bring different peripheral portions of the stones 16 into working engagement whereby to take advantage of the full surface thereof. Such manual operation is applied through the collar 19, and since the spring 18 supports the greater part of the weight, only a slight amount of pressure is necessary to effect the aforesaid oscillatory motion.

Figure 4:
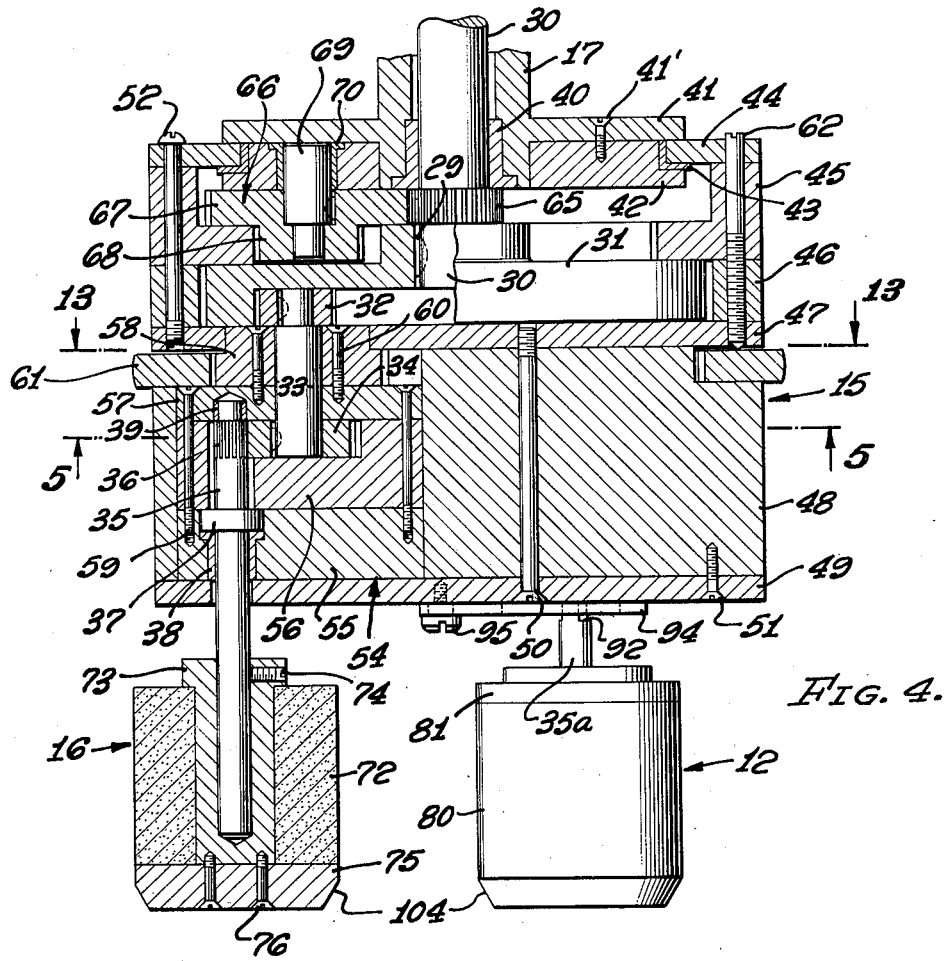
Figure 4 is an enlarged, partially sectioned elevation taken on a vertical plane through the central axis of the apparatus illustrated in Figure 1.
Figure 8:
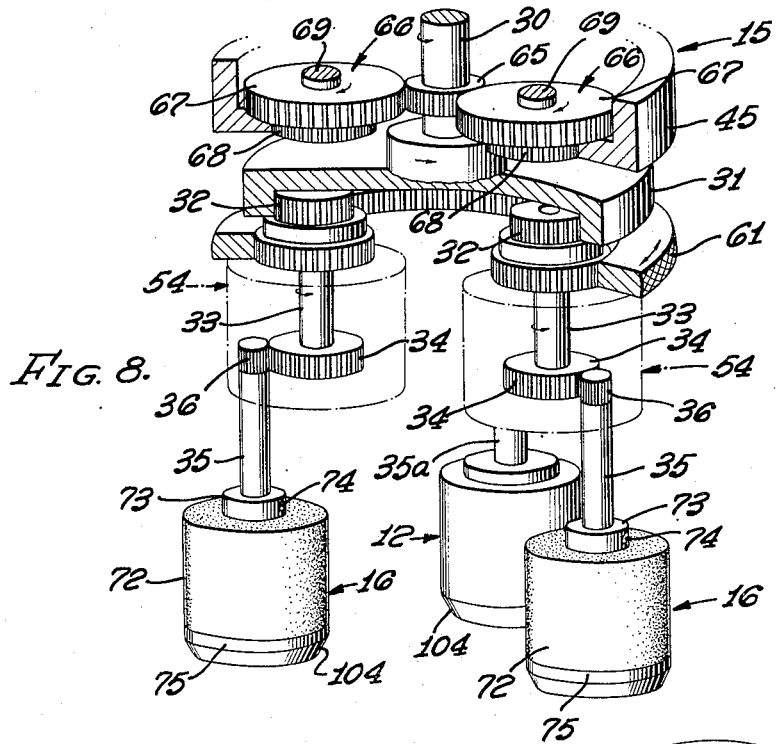
Figure 8 is a diagrammatic perspective view of the transmission systems employed in the apparatus illustrated in Figure 1.

Turning now to a description of the power transmission and adjustment means contained within the head 15, reference is made to Figures 4 and 8. First, considering the means for delivering the rotary power to each of the stones 16, it should be noted that such power is derived from the main power shaft 30 which rotates in a clockwise direction (looking up), and is transmitted through an internal gear 31 keyed to the lower end of the shaft 30 and through pinions 32 to idler shafts 33. Thence the power is delivered through idler gears 34 keyed to the lower end of the idler shafts 33 to pinion portions 36 cut in the upper ends of vertical shafts 35, which shafts project below the lower surface of the head 15 and upon each of which, one of the cylindrical stones 16 is mounted.

A lower journal bearing 38 and an upper journal bearing 39 support the shaft 35 for rotation in an adjustment cylinder 54 to be described presently. Downward thrust on the shaft 35 is taken by a collar 37 affixed thereto in a position to frictionally engage a flange on the upper end of the journal bearing 38. It is only necessary to deliver power to the stones 16, since the idler 12, if used, will rotate by reason of its frictional engagement with the wall of the cylinder. Thus the power transmission elements are provided in only those of the rotatably cylindrical supports 54, which carry stones 16.

It will be noted that the relative gear diameters are such as to effect a rotary speed of the stones 16 considerably greater than that of the shaft 30. Following the arrangement of the power transmission gears, it will also be noted that clockwise rotation of the shaft 30 results in clockwise rotation of the idler shaft 33, which in turn results in anti-clockwise rotation of the stone support shaft 35.

Considering next the construction and operation of the head 15 itself, it will be remembered that this portion is adapted to rotate in an anti-clockwise direction whereby to carry the stones 16 around an orbit inside the cylinder upon which they are operating. Such motion of the head 15 is made possible by the provision of a flange 41 formed on the lower end of the shank 17 to which a sub-flange 42 is secured by means of attachment screw 41'. The flange 41 and the sub-flange 42 secure a relatively large-diameter flanged bearing 43 therebetween, upon which is supported a ring shaped upper plate 44 for the head 15, which is adapted to rotate on the bearing 43 around the axis of the shank 17. The balance of the head 15 depends from the upper plate 44 and comprises a ring gear section 45, a ring shaped spacer 46, an intermediate plate 47, a lower section 48 and a bottom plate 49.

All of the ring shaped portions 44 through 49 are of the same outer diameter whereby to provide a head of generally cylindrical shape. The various portions just described are secured together by three screws 50 which secure the bottom plate 49 and the lower section 48 to the intermediate plate 47, and by a number of peripheral screws 52 which secure the upper plate 44, the ring gear 45, and the ring shaped spacer 46 to the intermediate plate 47. As will be noted in Figure 4, various portions of the ring shaped members of the head 15 are cut away internally to provide spaces for the transmission members just described, and other members about to be described.

As has been previously stated, it is desirable to adjust the diameter orbit traveled by the stones 16 and the idler 12. This adjustment is effected by mounting the shafts 35, of the stones 16 and a shaft 35a of the idler 12 in rotatable cylindrical support blocks 54. These support blocks are mounted for limited rotary motion within the head 15 and are each comprised of a lower section 55, an intermediate section 56, an upper section 57, and an adjustment gear 58 of the upper section 57. The various parts of the support cylinders 54 are secured together by screws 59 which secure the upper and intermediate sections 57 and 56 respectively to the lower section 55 and by screws 60, which secure the adjustment gear 58 to the upper section 57.

Figure 3:
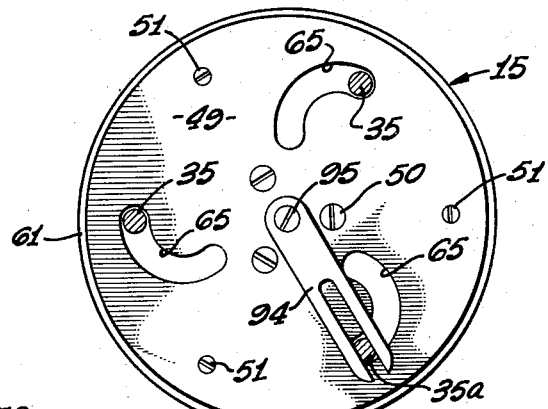
Figure 3 is a partial plan view looking upwardly along the line 3—3 in Figure 1.
Figure 5:
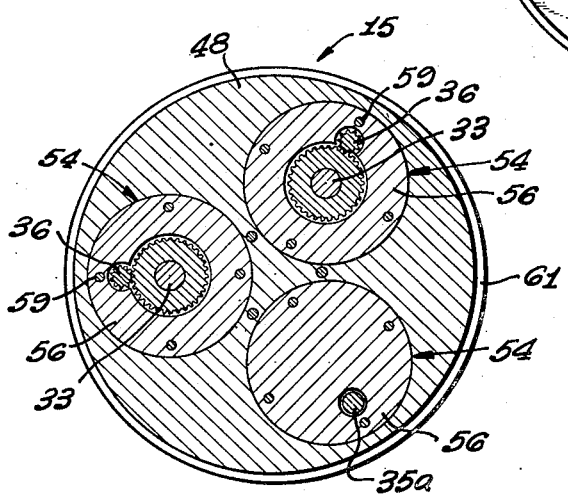
Figure 5 is a sectional plan view looking upwardly on the line 5—5 in Figure 4.

As will be seen from an examination of Figure 3, arcuate slots 65 are formed in the lower plate 49 of the head 15 through which the shafts 35 and 35a project. Thus rotation of the cylindrical support member 54 within the lower section 48 serves to swing the shafts 35 and 35a inwardly or outwardly along the arcuate slot 65 whereby to change the diameter of the aforesaid orbit. It will also be noted from an examination of Figures 4 and 5 that such orbit adjusting rotation of the support member 54 is about an axis coincident with the axis of the idler shaft 33. Thus the adjusting rotation of the cylinder 54 does not disturb the meshing relationship between the ring gear 31 and the idler pinion 32.

Simultaneous rotation of the three support cylinders 54 is effected by means of an internal ring gear 61 which is mutually meshed with the three adjustment gears 58. As can be best seen in Figure 4, the outer periphery of the ring gear 61 projects somewhat beyond the cylindrical surface of the head 15 and is knurled, whereby this ring may be grasped and rotated to simultaneously rotate the three supporting cylinders 54. Thus since the shafts 35 and 35a are simultaneously adjusted, they are always positioned in a circle concentric with the axis of the shank 17 and the rotating head 15. When stones 16 and the idler 12 have been adjusted to the desired circle diameter, the ring gear 61 is clamped in that position by means of a set screw 62 threaded into the spacer 46 in the intermediate plate 47 in a position to engage the upper surface of the ring gear 61.

Turning now to a discussion of the means whereby the head 15 is driven in anti-clockwise rotation (looking up) as previously described, it will be noted in Figure 8 that a pinion 65 is secured to the power shaft 30 near the lower end thereof and is positioned to engage a pair of step gears 66. Each step gear 66 has a stub shaft 69 keyed therein and projecting upwardly to rotatably support the step gear in a journal bearing 70 pressed into the sub-flange 42. As best seen in Figure 8, the pinion 65 meshes with the large diameter portion 67 of the step gear 66 while the small diameter portion meshes with the ring gear section 45, which as previously described, is a fixed portion of the head 15. Thus, clockwise rotation of the shaft 30 effects anti-clockwise rotation of the step gears 66, which in turn effects anti-clockwise rotation of the ring gear section 45, and hence the head 15, as previously described.

The structure just described is adapted to support and rotate cutters and stones of various types on the lower end of the shaft 35. The grinding stone 16 illustrated herein is of a conventional type comprising a cylindrical stone portion 72 cemented or otherwise secured to a metal core 73, which in turn is adapted to be secured by means of a set screw 74 to the lower end of the shaft 35. Secured to the lower end of the core 73 by means of screws 76 is a guide roller section 75 constructed of a material which is adapted to be dressed off to a diameter equal to that of the stone portion 72 during the operation of dressing the stone, and which will wear off in use at a rate approximately that of particular stone used. It will be noted from an examination of Figure 1 that the guide section 75 is positioned adjacent the worn part of the cylinder 26. Thus when the guide section 75 comes in contact with the cylinder wall, the grinding operation of the stone portion 72 ceases, since the ridge 25 has, by that time, been removed.

Figure 10:
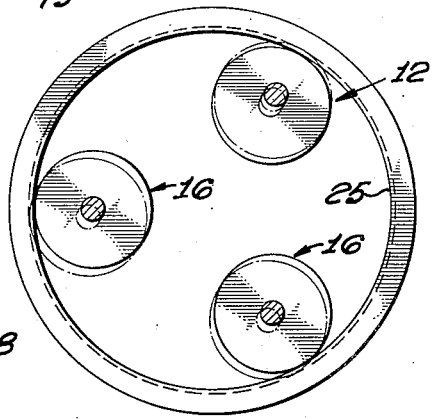
Figure 10 is a diagrammatic plan view showing the relative positions occupied by the rotary stones and idler roller during progressive operation of the apparatus illustrated in Figure 1.

In order that the stone portion 72 continue to operate with optimum efficiency while it is being rotated and revolved about its orbit, it is necessary that considerable outward pressure be continuously applied during this operation. The effect of such pressure is illustrated in Figure 10 wherein it will be seen that as the grinding proceeds toward a limit indicated by the dotted lines therein, the idler 12, if forced outwardly on a radial line, will maintain a constant peripheral pressure on the stones 16. The phantom lines in Figure 10 show the ultimate position assumed by the stones 16 and the idler 12 at the termination of the grinding operation.

Figure 6:
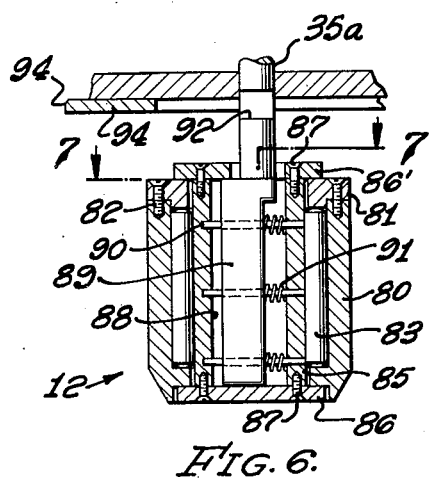
Figure 6 is an elevational partially sectioned view taken on a vertical axial plane through the idler roller used in the apparatus illustrated in Figure 1.

Various means may be used to effect the outward pressure of the idler roller 12, one of which is illustrated in Figure 6. Referring to Figure 6, it will be noted that the rotating portion of the idler 12 is comprised of an outer shell 80 and an upper collar 81 secured thereto by means of screws 82. The shell 80 rotates on bearing rollers 83, which in turn are supported on an inner core portion 85 and held against vertical displacement by plates 86 and 86' secured to the lower and upper surfaces of the core 85 by screws 87.

Figure 7:
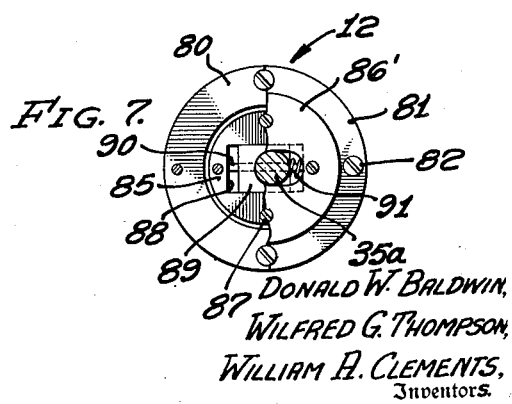
Figure 7 is a partially sectioned plan view taken on the line 7—7 in Figure 6.

As best seen in Figure 7, a bore 88 of rectangular cross section is formed in the core 85. The shaft 35a, which supports the idler 12, is formed with a rectangular portion 89 on its lower end adapted to have a sliding fit against two sides of the bore 88. Thus the core 85 is adapted to move laterally as viewed in Figure 7 with respect to the shaft portion 89. Three transverse pins 90 are pressed into the core 85 and have a sliding fit in the shaft portion 89 whereby to maintain a parallel relationship between the shaft portion 89 and the core at all times. Three compression springs 91, surrounding the pins 90 and positioned between the right-hand edge of the rectangular shaft portion 89 and the right-hand inner surface of the rectangular bore 88, serve to urge the core 85 to the right in Figure 6.

It is essential that the alignment of the rectangular shaft portion 89 be such that at all times the outward motion urged by the springs 91 is radial with respect to the axis of the head 15. In order to maintain such alignment, a pair of flats 92 are formed on the shaft 35a, which are engaged by a slotted arm 94, which is pivotally secured by a shoulder screw 95 at the center of the bottom plate 94. Thus as the shaft 35a is moved in the arcuate slot 65 by rotation of the support cylinder 54, the alignment of the flats on the shaft with the slots in the arm 94 maintain the properly aligned position of the rectangular shaft portion 89 at all times, regardless of the adjusted position of the idler roller 12, the shaft 35a being free to turn somewhat in the cylinder 54.

Figure 9:
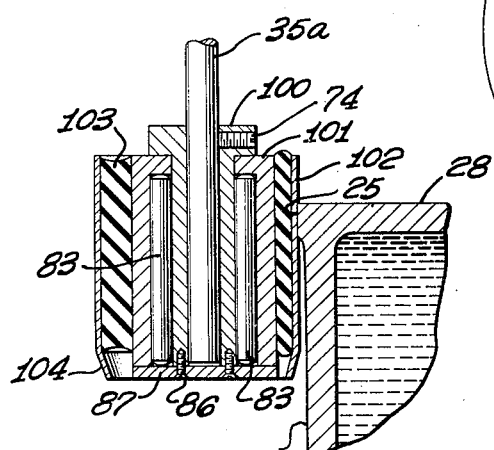
Figure 9 is an elevational section taken on an axial plane through a modified idler roller of the apparatus illustrated in Figure 1, showing the same positioned against a cylinder ridge.

One alternate form of idler roller is illustrated in Figure 9 wherein it will be seen that a central core 100 is provided and secured to the shaft by means of a set screw 74. An intermediate core 101 is rotatably supported by bearing rollers 83 on the inner core 100 and is rotatably supported by bearing rollers 83 on the inner core 100 by means of a plate 86 and screws 87. An outer steel shell 102 is secured to the intermediate core 101 by means of a deformable bushing 103 constructed of rubber or a similar material. Thus the intermediate core 101, the deformable bushing 103, and the outer shell 102 rotate as a unit. As will be noted in Figure 9, when the shell 102 is brought into pressure contact with a ridge 25 in the cylinder 26, the deformable bushing 103 is compressed on the contact side and stretched on the opposite side whereby to maintain the contact pressure against the ridge as indicated in Figure 10. As it best seen in Figures 8 and 9, the lower ends of the stones 16 of the idler roller 12 have a conical portion 104 and are thus adapted to be forced into a cylinder whereby to compress the deformable bushing as shown in Figure 9, or if the roller of Figure 6 is employed, to compress the springs 91.

Figure 11:
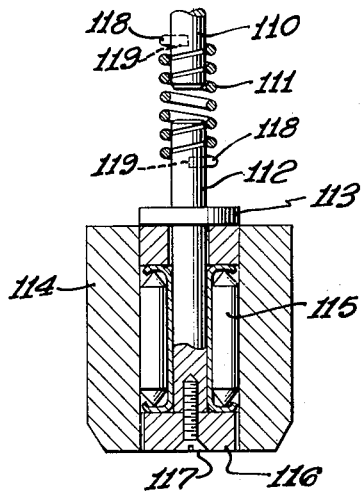
Figure 11 is a partially sectioned elevational view of a second modified form of idler roller.
Figure 12:
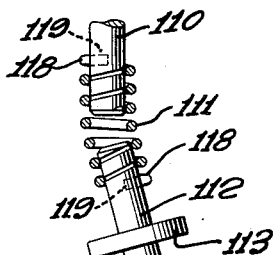
Figure 12 is a fragmentary view of a portion of the apparatus illustrated in Figure 11 with the parts shown in an operative position.

A second alternate form of idler roller is illustrated in Figures 11 and 12. From an examination of Figure 11, it will be noted that the idler shaft is, in this modified form, separated into an upper portion 110 and a lower portion 112. The upper portion 110 and the lower portion 112 are connected by a relatively heavy coil spring 111. A helical groove is formed in each of the shaft portions 110 and 112, and the spring 111 is threaded onto this helical groove in screw fashion. The ends of the spring are bent inwardly as indicated at 118 to enter holes 119 formed in the shaft portions 110 and 112.

In the operation of the second modified form illustrated in Figure 11, both of the shaft portions 110 and 112 are non-rotating with respect to the head 15. The roller 114 of the second modified form rotates on a roller bearing 115 and is secured to the shaft by means of a cap 116 secured to the lower end of the shaft with a screw 117. Upward thrust of the roller 114 is taken by a collar portion 113 formed on the shaft 112.

When the second modified roller is placed in operation in the manner described in connection with the previous embodiments, the lower shaft portion 112 is, by reason of the pressure engagement of the roller 114 against the cylinder wall, deflected with respect to the upper shaft portion 110 as illustrated in Figure 12. Such deflection is toward the axis of the head 15 and is, of course, resiliently resisted by the spring 111. Thus the desired divergent pressure is effected in the same manner as described in connection with the previous embodiments.

In certain instances it may be desirable to dispense with the idler roller entirely and employ three rotary stones 16 or cutters, instead of the two described in the previous embodiments. In order to obtain resilient divergent motion of the three rotary stones employed in this manner, a modification of the orbit adjusting ring gear has been provided. Instead of the single ring gear 61 previously employed for this purpose, the ring gear modified form is separated into two concentric ring shaped portions 120 and 121. The innermost portion 121 is provided with internal gear teeth corresponding to those on the single ring gear 61 of the previous embodiment. The outer portion 120 is held in slidable concentric relation with the inner portion 212, the two portions being held in place between the lower head section 15 and the intermediate transverse plate 47.

When three rotary stones 16 are employed, such stones are rotatably mounted in three identical adjustment cylinders 54, and power is transmitted to the stones through three identical transmission systems comprising the idler pinion 32, the idler shaft 33, the idler gear 34, and the pinion portion 36 on the shaft 35.

Figure 15:
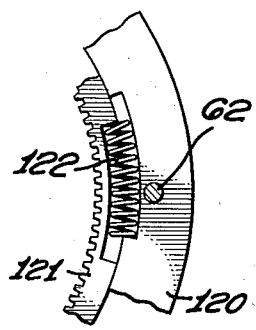
Figure 13:
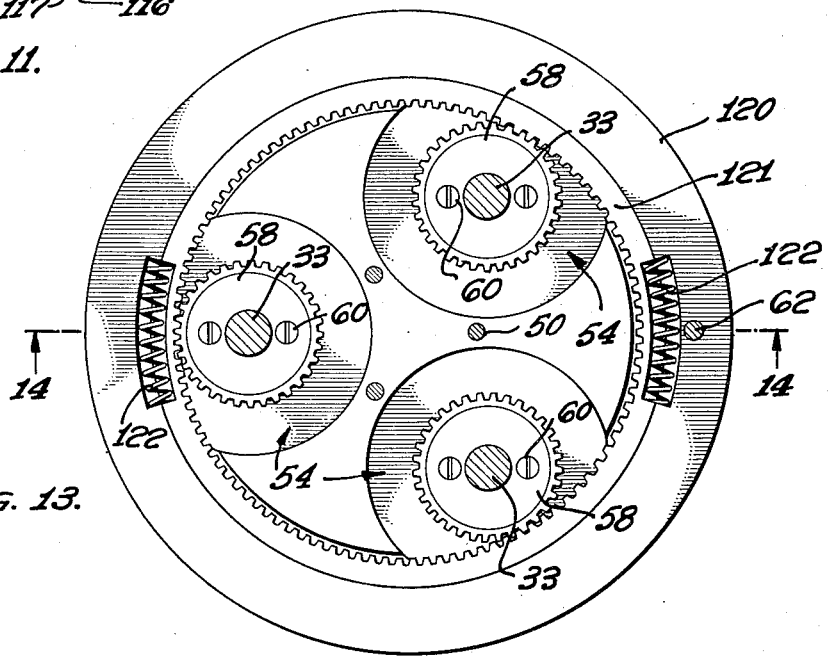
Figure 13 is a sectional view taken on the line 13—13 in Figure 4 but showing a modified form of the orbit adjusting means which incorporates spring loading means.
Figure 14:
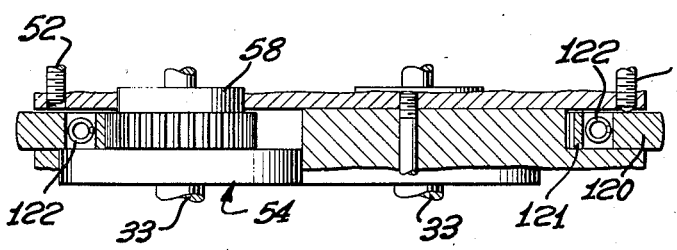
Figure 14 is a fragmentary elevational section taken on the line 14—14 in Figure 13; and, Figure 15 is a fragmentary view of the parts shown in Figure 13 but with said parts in an operative position.

In order to resiliently urge divergent motion of the three rotary stones of the last mentioned modified form, a pair of compression springs 122 are provided and mounted in cavities formed in the inner and outer portions of the ring gear 121 and 120 respectively. Thus when the outer portion 120 is rotated, it drives the inner portion 121 through the compression springs 122. If such motion of the inner gear portion 121 is resisted, as for example by the stones coming in contact with the cylinder wall, further motion of the outer gear portion 120 results in compressing the springs as indicated in Figure 15. Conversely, if the three stones are forced inwardly, as for example by forcing them into a cylinder having a diameter less than the orbit to which they have been adjusted, such motion of the stones will be communicated by the gears 58 to the ring gear portion 121, whereby to compress the springs as shown in Figure 15.

Thus it will be seen that by clamping the outer ring portion 120 in an adjusted position with the stones lying on an orbit slightly larger than the cylinder into which they are to be placed, the stones will, when inserted into the cylinder, maintain their outward operative pressure. In order to so clamp the modified ring gear, the clamping screw 62 is positioned to engage the outer portion 120.

The operation of the device in the cylinders of automotive engines is as follows. The cylinder head of the engine is removed, preferably leaving one or more head retaining studs in place in the block adjacent each of the cylinders. The stones 16 and the idler roller (if employed) are then adjusted by loosening the set screw 62 and rotating the ring gear 61 until the outer peripheries of the stones 16 fall on a circle slightly larger than the largest diameter of the cylinder to be operated on, whereupon the screw 62 is retightened. The apparatus is then lowered into the position as indicated in Figure 1, power is applied from a convenient source (not shown) to the shaft 30. As the head 15 and the stones 16 carried thereby rotate, alternate pressure is applied to the collar 19 whereby to vertically oscillate the stones as they operate on the ridge 25. As the grinding operation proceeds, and the ridge 25 is removed, the lower guide section portion of the stones 16 will come in contact with the worn surfaces of the cylinder wall whereby to prevent further grinding operation.

In cases where extreme wear of the cylinder walls has taken place, it may be necessary to stop the operation at some point and readjust the stones 16 outwardly to renew the grinding pressure. In most cases, however, the single initial adjustment is sufficient to provide adequate displacement of the stones as the work progresses.

As in most grinding equipment of the class described, it is necesary to periodically dress the grinding stone. Such operations are usually performed with a diamond dressing tool in the manner well known in the art. When the stones are so dressed, however, care must be taken to also dress the guide portion 75 to an equal diameter.

While the grinding apparatus shown and described herein is fully capable of achieving the objects and providing the advantages hereinbefore stated, it is capable of considerable modification within the spirit of the invention. Therefore I do not mean to be limited to the forms shown and described herein, but rather to the scope of the appended claims.

We claim:

1. In cylinder shaping apparatus of the class described: a head mounted and adapted for powered rotation; a plurality of power driven rotary tools journaled in said head and projecting therefrom whereby to engage the interior wall of a cylinder; and idler means including a shaft mounted in said head and projecting therefrom, a nonrotating core mounted for lateral translatory motion on the outer end of said shaft, a roller journally mounted for free rotation with respect to said core and positioned to engage said cylinder wall, and yieldable resilient means connected between said core and shaft and stressed to urge outward motion of said core whereby to effect operative pressure engagement of said tools against said cylinder wall.

2. In cylinder shaping apparatus of the class described: a rotatable head; a plurality of cylindrical members journaled for limited rotation in said head about axes equally spaced from a central axis of said head, said members having relatively immovable gear portions thereon; an internal ring gear rotatably supported in said head and meshed with said gear portions whereby to effect simultaneous rotation of said members; a plurality of rotary tool shafts, each journaled in one of said members on an axis spaced from the rotary axis of said member whereby rotation of said members moves said tool shafts with respect to said central axis while maintaining the same on a circle about said central axis at all times; a member supported in said head for manual movement to lock said ring gear with respect to said head whereby to hold said tool shafts at any adjusted position thereof; a plurality of idler shafts each concentrically journaled in one of said members; a pinion on each of said idler shafts; a pinion on each of said tool shafts; a gear on each of said idler shafts, said idler gear being meshed with the pinion on the tool shaft mounted in the same member with said last mentioned idler shaft; a journally mounted drive shaft concentrically positioned on said central axis and projecting into said head; a gear adjacent the inner end of said drive shaft having common meshing engagement with said idler pinions whereby to simultaneously drive said idler shafts and tool shafts.

3. In cylinder shaping apparatus of the class described: a tool head; a plurality of cylindrical members journaled for limited rotation in said head about axes equally spaced from a central axis of said head, said members having relatively immovable gear portions thereon; an internal ring gear rotatably supported in said head and meshed with said gear portions whereby to effect simultaneous rotation of said members; a plurality of rotary tool shafts, each journaled in one of said members on an axis spaced from the rotary axis of said member whereby rotation of said members displace said tool shafts with respect to said central axis while maintaining the same on a circle concentric with said central axis at all times; means including a member mounted in said head for movement to interlock said ring gear and head whereby to hold said tool shafts at any adjusted position thereof; a plurality of idler shafts each concentrically journaled in one of said cylindrical members; a pinion on each of said idler shafts; a pinion on each of said tool shafts; a gear on each of said idler shafts, said idler gear being meshed with the pinion on the tool shaft mounted in the same member with said last mentioned idler shaft; a coaxial bearing formed in said head; a non-rotating shank projecting within said bearing and adapted to rotatably support said head; a drive shaft coaxially journaled in said shank and projecting into said head; a first gear fixed to said drive shaft adjacent the inner end thereof and having common meshing engagement with said idler pinions whereby to simultaneously drive said idlers and tool shafts; a second drive gear fixed to said drive shaft adjacent the inner end thereof; a plurality of gears journaled in said shank and meshed with said second drive gear; a driven gear integrally formed in said head and meshed with said gears in said shank whereby to drive said head from said drive shaft; and a support having a plurality of legs and a central collar portion slidingly engaged with said shank to support the same with said head adjacent the open end of a cylinder and with said tool shafts projecting thereinto, said collar portion being adapted to permit reciprocating axial motion of the shank.

4. In cylinder shaping apparatus of the class described: a tool head, a plurality of cylindrical members journaled for limited rotation in said head about axes equally spaced from a central axis of said head, said members having relatively immovable gear portions thereon; an internal ring gear rotatably supported in said head and meshed with said gear portions whereby to effect simultaneous rotation of said members; a plurality of rotary tool shafts, each journaled in one of said members on an axis spaced from the rotary axis of said member whereby rotation of said members displaces said tool shafts with respect to said central axis while maintaining the same on a circle concentric with said central axis at all times; an interlocking member supported for movement against said gear to clamp said ring gear against movement whereby to hold said tool shafts at any adjusted position thereof; a fixed shaft in one of said members and projecting therefrom in parallel spaced relationship with said tool shafts, said fixed shaft being so positioned on said member as to be on said concentric circle with said tool shafts at all times; an idler roller on the outer end of said fixed shaft, said roller including resilient means to urge outward motion thereof; a plurality of idler shafts each concentrically journaled in one of said members; a pinion on each of said idler shafts; a pinion on each of said tool shafts; a gear on each of said idler shafts, said idler gear being meshed with the pinion on the tool shaft mounted in the same member with said last mentioned idler shaft; a coaxial bearing formed in said head; a non-rotating shank projecting within said bearing and adapted to rotatably support said head; a drive shaft coaxially journaled in said shank and projecting into said head; a first gear fixed to said drive shaft adjacent the inner end thereof and having common meshing engagement with said idler pinions whereby to simultaneously drive said idlers and tool shafts; a second drive gear fixed to said drive shaft adjacent the inner end thereof; a plurality of gears journaled in said shank and meshed with said second drive gear; a driven gear integrally formed in said head and meshed with said gears in said shank whereby to drive said head from said drive shaft; and a support having a plurality of legs and a central collar portion surrounding said shank to support the same with said head adjacent the open end of a cylinder and with said tool shafts projecting thereinto, said collar portion being adapted to permit reciprocating axial motion of the shank.

5. In cylinder shaping apparatus of the class described: a head mounted and adapted for powered rotation; a plurality of cylindrical members in said head each adapted for limited rotation on an axis parallel to, but spaced from the rotary axis of said head; gear means including a single gear rotatably secured in said head and in common meshing engagement with said cylinder members whereby to effect simultaneous rotation thereof; a rotating member resiliently connected by a yieldingly deformable member to said gear means whereby to rotate the same while permitting resiliently resisted relative motion between said gear means and rotating member; means in said head to clamp said member in an adjusted position thereof; and a plurality of power driven rotary tools each projecting beyond said head whereby to engage the interior wall of a cylinder and each journaled in one of said cylindrical members, having its rotary axis parallel to, but spaced from the rotary axis of said cylindrical member whereby said simultaneous rotation of said cylindrical members effects simultaneous radial displacement of said rotary tool axes with respect to the rotary axis of said head.

6. In cylinder shaping apparatus of the class described: a head mounted and adapted for powered rotation; a plurality of power driven rotary tools journaled in said head and projecting therefrom whereby to engage the interior wall of a cylinder; and idler means including a shaft mounted in said head and projecting therefrom, a second shaft positioned on the extended axis of said first shaft, a helical spring coaxially positioned with respect to said shafts and connecting the same at their adjacent ends, and a roller journally mounted on the extended end of said second shaft in position to engage said cylinder wal, whereby said second shaft and said roller mounted thereon is adapted to be deflected against resilient resistance from the axis of said first shaft.

7. In cylinder shaping apparatus of the class described: a tool head; a plurality of cylindrical members journaled for limited rotation in said head about axes equally spaced from a central axis of said head, said members having relatively immovable gear portions thereon; an internal ring gear rotatably supported in said head and meshed with said gear portions whereby to effect simultaneous rotation of said members; a rotating collar for said last mentioned ring gear coaxially positioned on said ring gear and rotatable thereon; spring means positioned between said collar and ring gear to effect resilient driving connection between said members; a movably mounted locking member positioned in said head and manually operable to clamp said rotating collar to said head to prevent rotation thereof while permitting resiliently limited rotation of said ring gear; a plurality of rotary tool shafts, each journaled in one of said members on an axis spaced from the rotary axis of said member whereby rotation of said collar displaces said tool shafts with respect to said central axis while maintaining the same on a circle concentric with said central axis at all times; a plurality of idler shafts each concentrically journaled in one of said cylindrical members; a pinion on each of said idler shafts; a pinion on each of said tool shafts; a gear on each of said idler shafts, said idler gear being meshed with the pinion on the tool shaft mounted in the same member with said last mentioned idler shaft; a coaxial bearing formed in said head; a non-rotating shank projecting within said bearing and adapted to rotatably support said head; a drive shaft coaxially journaled in said shank and projecting into said head; a first gear fixed to said drive shaft adjacent the inner end thereof and having common meshing engagement with said idler pinions whereby to simultaneously drive said idlers and tool shafts; a second drive gear fixed to said drive shaft adjacent the inner end thereof; a plurality of gears journaled in said shank and meshed with said second drive gear; a driven gear integrally formed in said head and meshed with said gears in said shank whereby to drive said head from said drive shaft; and a stationary support having a plurality of legs and a central collar portion surrounding said shank to support the same with said head adjacent the open end of a cylinder and with said tool shafts projecting thereinto, said collar portion being adapted to permit reciprocating axial motion of the shank.

DONALD W. BALDWIN.
WILFRED G. THOMPSON.
WILLIAM A. CLEMENTS.

REFERENCES CITED

The following references are of record in the file of this patent:

UNITED STATES PATENTS

| Number | Name | Date |
|---|---|---|
| 854,819 | Georges | May 28, 1907 |
| 1,217,419 | Cumming | Feb. 27, 1917 |
| 1,429,135 | Gutenson | Sept. 12, 1922 |
| 1,499,754 | Sproul | July 1, 1924 |

FOREIGN PATENTS

| Number | Country | Date |
|---|---|---|
| 13,857 | Great Britain | Aug. 2, 1900 |
| 22,869 | Great Britain | Oct. 16, 1906 |